United States Patent
Huang

[11] Patent Number: 5,771,516
[45] Date of Patent: Jun. 30, 1998

[54] EXCHANGEABLE POWER HAND TOOL

[76] Inventor: Chen Shu-Hsia Huang, 8F, No. 472 Sec. 3 Ming-Chih Road, Tai-Shan Hsiang, Taipei Hsien, Taiwan

[21] Appl. No.: 702,926

[22] Filed: Aug. 26, 1996

[51] Int. Cl.[6] ...................................................... B25F 1/02
[52] U.S. Cl. ...................... 7/100; 7/138; 7/170; 254/122; 254/124
[58] Field of Search ............................... 7/100, 170, 138; 81/57.14; 254/122, 124, 126

[56] References Cited

U.S. PATENT DOCUMENTS

| | | | |
|---|---|---|---|
| 1,298,504 | 3/1919 | Hollingshead | 81/57.14 |
| 4,721,022 | 1/1988 | Batten | 81/57.14 |
| 4,727,780 | 3/1988 | Huang | |
| 4,749,169 | 6/1988 | Pickles | 254/122 |
| 4,833,746 | 5/1989 | Yong | 7/170 |
| 4,920,831 | 5/1990 | Huang | |
| 4,943,034 | 7/1990 | Wagnon | 254/122 |
| 4,947,939 | 8/1990 | Huang | |
| 5,035,161 | 7/1991 | Huang | |
| 5,412,546 | 5/1995 | Huang | |

FOREIGN PATENT DOCUMENTS

| | | |
|---|---|---|
| 589089 | 3/1987 | Australia . |
| 1245482 | 11/1988 | Canada . |
| 2030473 | 9/1994 | Canada . |
| 24796 | 11/1990 | China . |
| 213255 | 2/1995 | China . |
| 381787 | 2/1989 | European Pat. Off. . |
| 3017657 | 8/1995 | Japan . |
| 7-42617 | 10/1995 | Japan . |
| 34467 | 1/1976 | Taiwan . |
| 62327 | 11/1994 | Taiwan . |

*Primary Examiner*—D. S. Meislin
*Assistant Examiner*—Lee Wilson
*Attorney, Agent, or Firm*—Ostrolenk, Faber, Gerb & Soffen, LLP

[57] ABSTRACT

An exchange power hand tool includes a power section having a motor encased in a housing and two tool sections, respectively serving as a wrench and a jack actuator, alternately and exchangeably engageable with the power section to be driven thereby so as to provide one power hand tool with two functions. The power section has an output pinion mounted on the motor spindle to be engageable by a driving gear chain of the tool sections for transmission of torque from the power section to the tool section for selectively performing wrenching operation or jack actuation.

10 Claims, 7 Drawing Sheets

EXCHANGEABLE POWER HAND TOOL

FIELD OF THE INVENTION

The present invention relates generally to a power hand tool and in particular to a separable power hand tool of which the power section is alternately and exchangeably engageable with two tool sections, respectively serving as a wrench and a jack actuator.

BACKGROUND OF THE INVENTION

Power wrenches for loosening/tightening stud bolts and/or nuts are known, such as U.S. Pat. Nos. 4,727,780, 4,920,831, 4,947,939, 5,035,161 and 5,412,546, Japanese patent publication No. 7-42617 and Japanese utility model No. 3017657, Chinese patent Nos. 24796 and 213255, Canadian patent Nos. 1,245,482 and 2,030,473, Australian patent No. 589089 and Taiwanese patent Nos. 34467 and 62327. These wrenches usually comprise a housing inside which a motor is fixed to mechanically coupled to a torque transmission mechanism also housed in the housing for generation of intermittent torque pulse which is particularly suitable for performing loosening/tightening operation of stud bolts and thus is an excellent portable tool to be carried in a car for flat tire change purpose. The mechanical coupling between the motor and the torque transmission mechanism may be done by providing teeth on the spindle of the motor to be engageable with inner toothed bore of the torque transmission mechanism.

On the other hand, although the power wrenches disclosed in the above prior patents are compact and light-weighted and thus suitable to be carried in a car for flat tire change purpose, yet it still needs a jack to heighten the car in order to perform flat tire change operation. Due to such a need of a jack in changing a flat tire, it may also be required to have a power tool for actuating the jack in order to efficiently heighten the car.

Carrying inside the car a power tool for actuating the jack is certainly feasible, for there may be sufficient space to accommodate such a jack actuator. However, in certain cases, there may not be enough space of the car for the jack actuator. Thus, it may be needed to provide a single tool with the functions of both a wrench and a jack actuator so as to save car interior space.

SUMMARY OF THE INVENTION

An object of the present invention is to provide a power hand tool comprising a power section to which a wrench and a jack actuator are alternately and exchangeably engageable to be driven thereby so that a single power hand tool has two different functions.

To achieve the above objects, there is provided an exchange power hand tool comprising a power section having a motor encased in a housing and two tool sections, respectively serving as a wrench and a jack actuator, alternately and exchangeably engageable with the power section to be driven thereby so as to provide one power hand tool with two functions. The power section has an output pinion mounted on the motor spindle to be engageable by a driving gear chain of the tool sections for transmission of torque from the power section to the tool section for selectively performing wrenching operation or jack actuation.

The and other objects and advantages of the present invention will become more apparent from a consideration of the following detailed description of preferred embodiments thereof, when read in conjunction with the accompanying drawings, wherein:

DETAILED DESCRIPTION OF THE PREFERRED EMBODIMENTS

Figure 1:
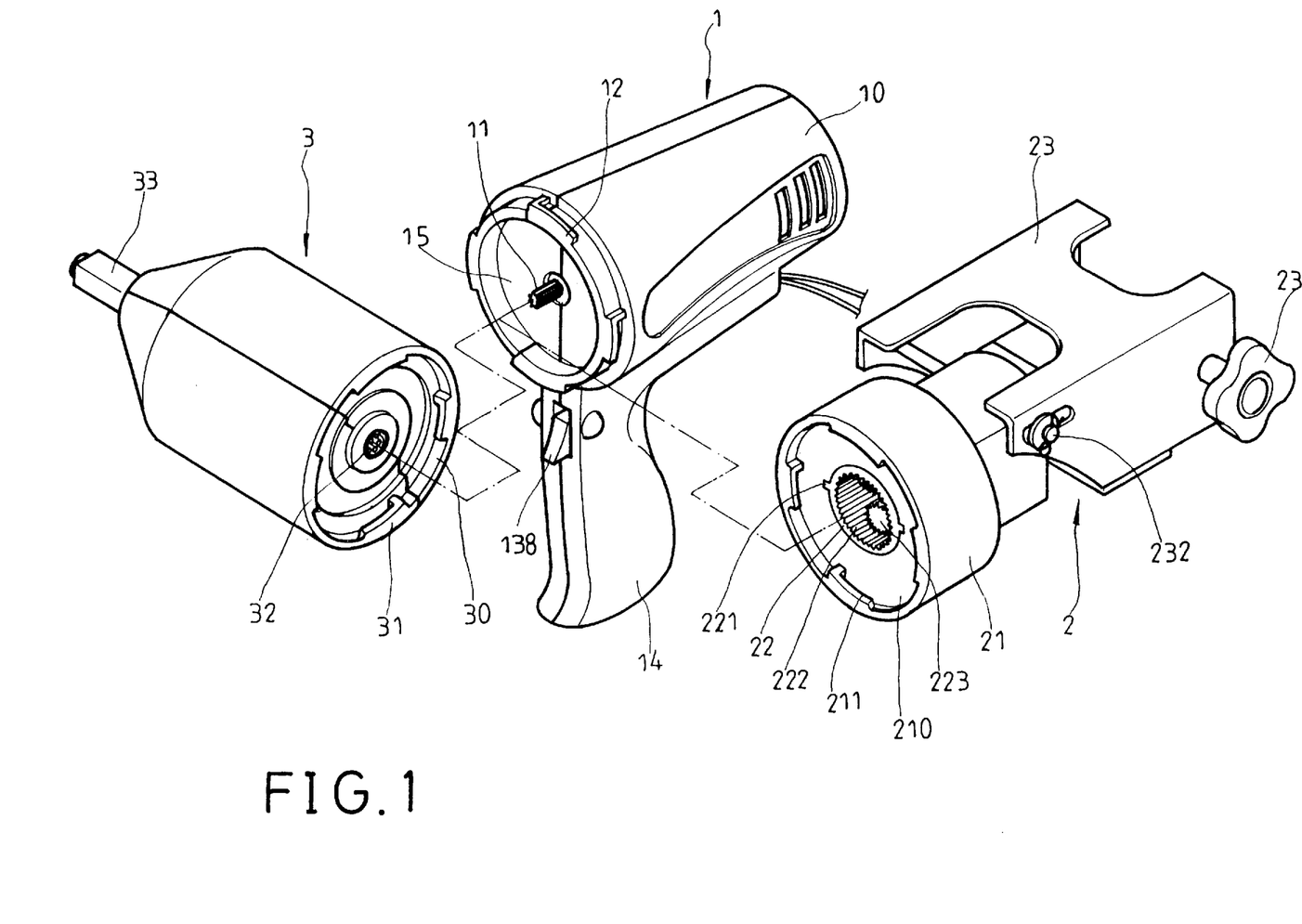
FIG. 1 is a perspective view showing an exchangeable power hand tool in accordance with the present invention, wherein the two tool sections are shown separated from the power section.

Referring to the drawings and in particular to FIG. 1, wherein an exchangeable power hand tool constructed in accordance with the present invention is shown, the power hand tool in accordance with the present invention comprises a power section, generally designated at 1, to which two tool sections, respectively referred to as jack actuator section 2 and wrench section 3, ate alternately and exchangeably engageable to be driven thereby.

The power section 1 comprises a housing 10 inside which an electrical motor (not shown) is fixed and actuateable by a user-accessible switch 138. Preferably, the housing 10 is provided with a handle 14 for hand holding purpose, with the switch 138 arranged at a suitable position on the handle 14 to be easily accessible by the user's finger (not shown). The motor has a spindle extending outside the housing 10 from a front, engaging face 15 of the housing. The spindle is provided with a pinion 11 fixed thereon or integrally formed thereon.

The engaging face 15 of the housing 10 of the power section 1 is provided with connection means, such as bayonet type connector 12 to engage the tool section 2 or 3 to be connected thereto.

Figure 2:
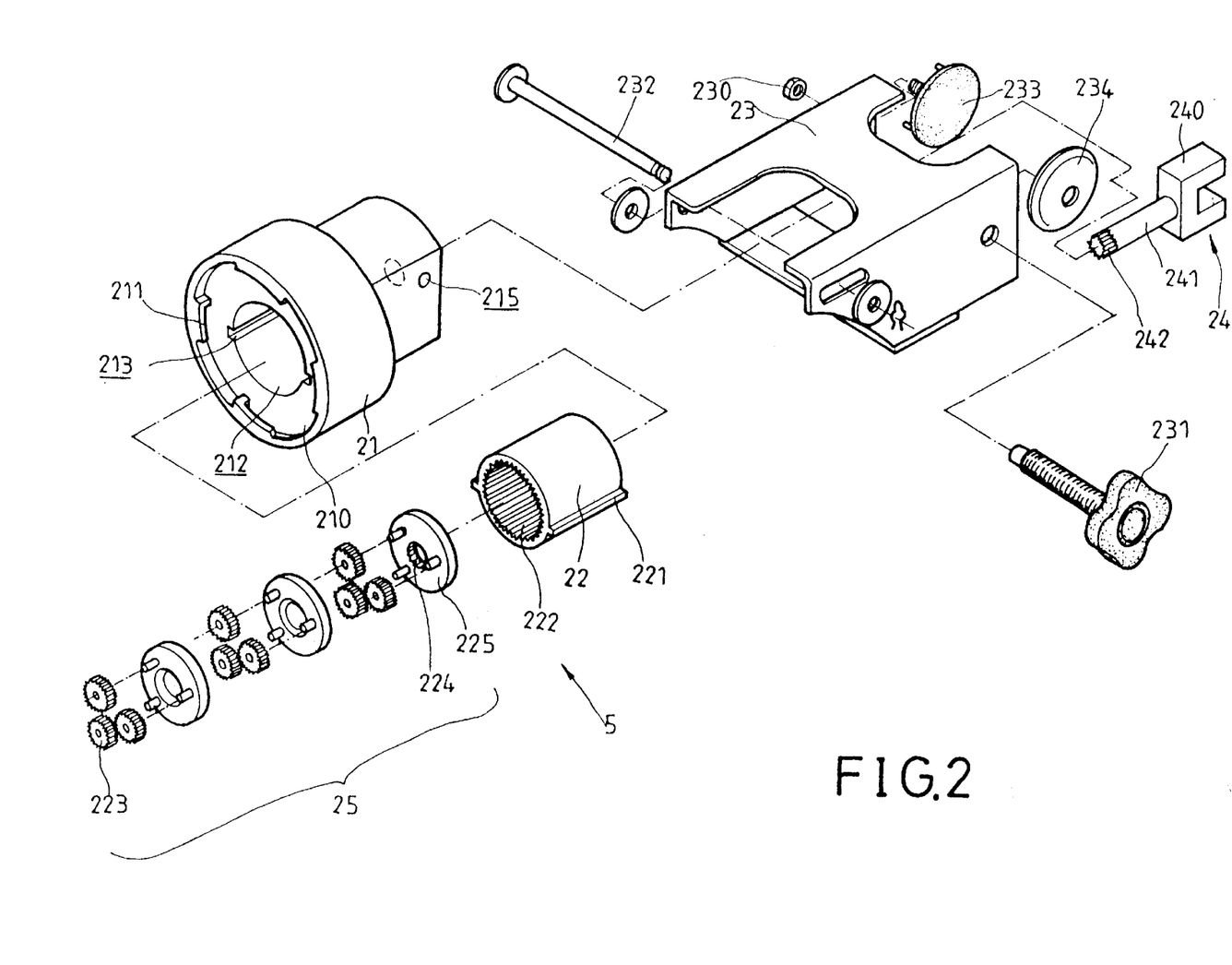
FIG. 2 is an exploded perspective view showing the jack actuator section in accordance with the present invention.

Also referring to FIG. 2, the jack actuator section 2 comprises a housing 21 having a central bore 212 into which a gear train 5 is disposed and fixed. The gear train 5 may be any suitable gear system which is engageable with the output pinion 11 of the power section 1 to transmit torque to an end effector 24 engageable with a jack 4, see FIG. 8.

Figure 8:
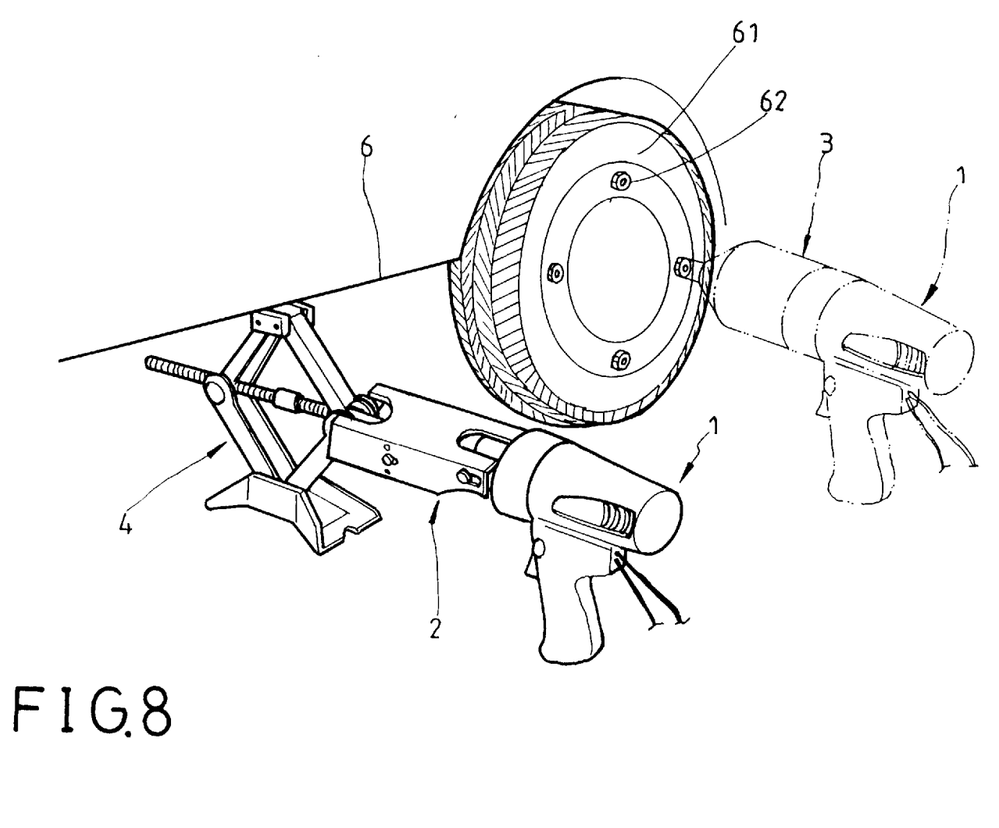
FIG. 8 is a perspective view showing using the power hand tool of the present invention to change a flat tire.

For example, in the embodiment illustrated, the gear train 5 comprises a cylinder 22 securely fixed inside the central bore 212 of the housing 21, preferably by having axially extending ribs 221 formed thereon received within corresponding slots 213 formed inside the central bore 212, as shown. The cylinder 22 comprises inner teeth 222 to serve as a ring gear of the gear train 5 inside which a planetary gear system 25 is arranged. The planetary gear system 25 has three input planet gears 223 engageable with the ring gear 22 and define therebetween an opening into which the pinion 11 of the output spindle of the power section 1 is insertable and engageable with the planet gears 223 to serve as an input sun gear. The planetary gear system 25 further comprises an output disk 225 on which an inner-toothed central hole 224 is formed to receive and engage a toothed end 242 of the end effector 24 so as to drive the end effector 24 to actuate the jack 4 (FIG. 8).

The jack actuator section 2 further comprises a secondary casing 23 pivoted to the housing 21 by means of a pivot pin 232 extending through a pivot hole 215 formed on the housing 21. The end effector 24 comprises an elongated shaft 241 having a first end on which teeth 242 are formed and an opposite end on which a U-shaped engaging member 240 is provided. The elongated shaft 241 extends through the secondary casing 23 to have the toothed end 242 engaging the toothed hole 224 of the output disk 225 of the gear train 5 to be driven thereby. The U-shaped member 240 of the end effector 24 extends outside the secondary casing 23 to engage and drive the jack 4.

The housing 21 of the jack actuator section 2 is provided with connecting means, such as bayonet connector 211 on the outer periphery of the outward base 210 of the housing 21 and engageable with the bayonet connector 121 of the housing 10 of the power section 1. By having the jack actuator section 2 mounted to the power section 1 by means of the bayonet connectors 121 and 211 with the pinion 11 of the power section 1 engaging the input planet gears 223 of the jack actuator section 2, the jack 4 is automatically actuated by the rotation of the motor of the power section 1 through the end effector 24 which is rotated by the planetary gear system 25 of the jack actuator section 2.

Preferably, the end effector 24 comprises two retaining plates 233 and 234 which are adjustable in position relative to each other and relative to the U-shaped member 240 for more securely retaining the engagement between the U-shaped member 240 and the jack 4. The two retaining plates 233 and 234 are opposite to each other and located at opposite sides of the U-shaped member 240 of the end effector 24. The retaining plate 233 is fixed to the secondary casing 21 by means of a nut 230, while the retaining plate 234 is provided with a threaded bolt 231 to adjust its position relative to the retaining plate 233 to secure the engagement between the jack 4 and the end effector 24. Preferably, each of the retaining plates 233 and 234 is provided with a rubber-coated face.

Figure 3:
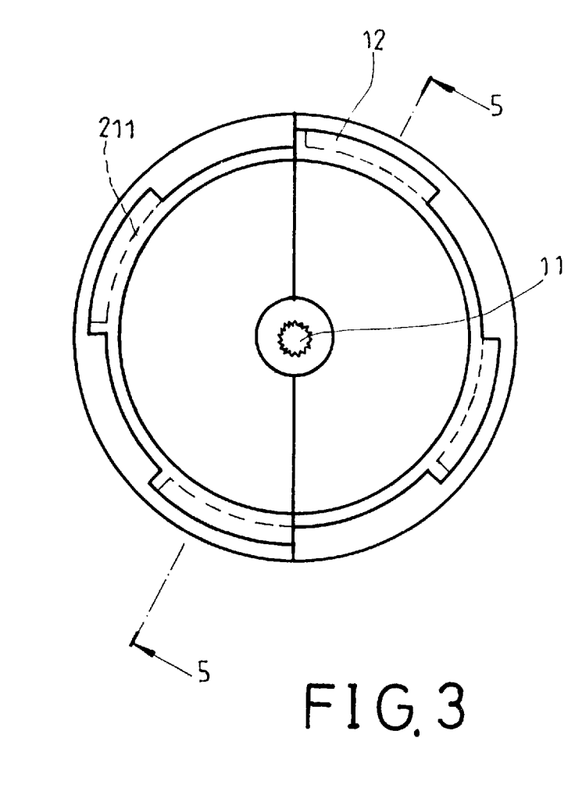
FIGS. 3 and 4 are schematic views respectively showing the engagement and disengagement between the power section and the jack actuator section in accordance with the present invention.
Figure 4:
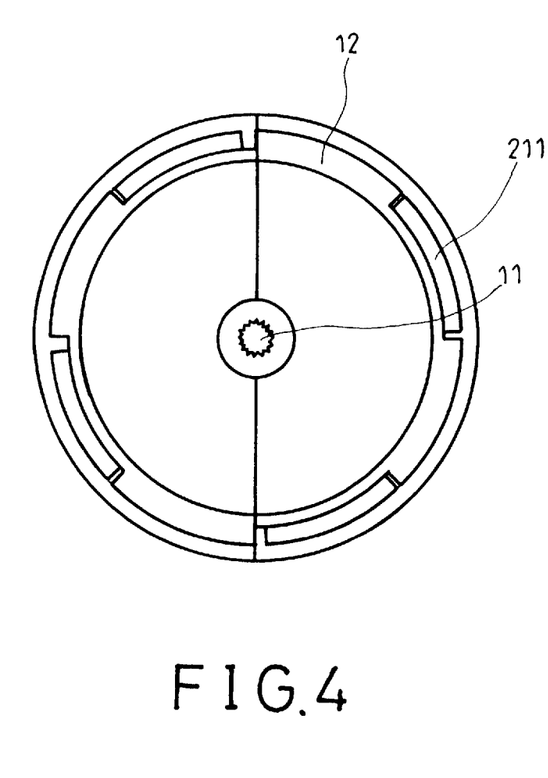
Figure 5:
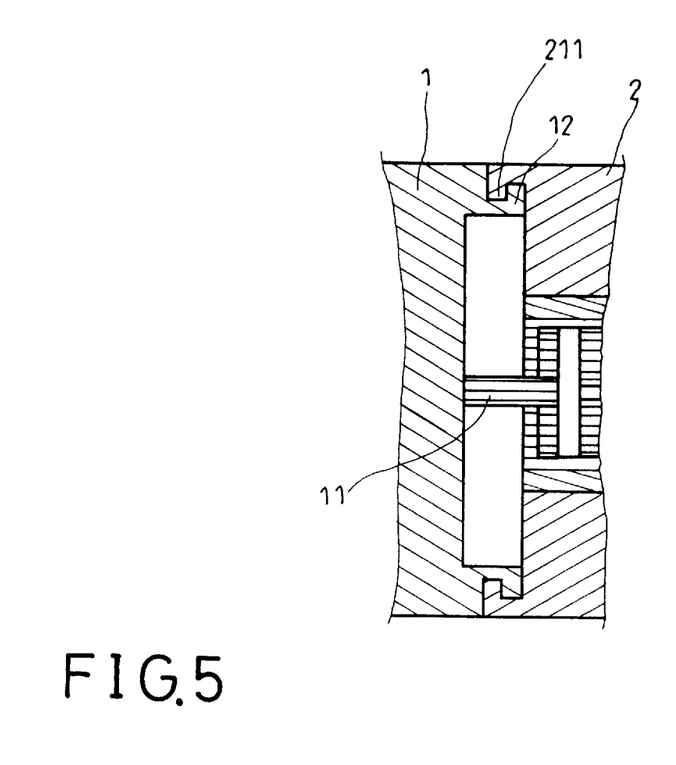
FIG. 5 is a partial cross-sectional view taken along line 5—5 of FIG. 3.

The engagement and disengagement between the bayonet connectors 12 and 211 of the power section 1 and the jack actuator section 2 are respectively shown in FIGS. 3 and 4 which are self-explanatory and need no more discussion. In FIG. 5, a cross-sectional view showing the engagement between the bayonet connectors 12 and 211 is illustrated.

The structure of the wrench section 3 comprises a housing 30 having an engaging face on which connecting means, such as bayonet connector 31, is provided to engage the bayonet connector 12 of the power section 1. A torque transmission mechanism, such as those discussed in the above-referenced prior patents, is arranged inside the housing 30, having an inner toothed member 32 engageable with the pinion 11 of the power section 1 to be driven thereby. The torque transmission mechanism comprises a driving tip 33 extending out of the housing 30 to engage for example a socket (not shown) for performing bolt loosening/tightening operation.

In operation, see FIG. 8, a user may first mount the jack actuator section 2 to the power section 1 and turn on the power section 1 to actuate the jack 4 for heightening a car 6 at a location in proximity of a flat tire 61. When the car 6 is heightened enough, the power section 1 is turned off and the disengaged from the jack actuator section 2. The wrench section 3 is then connected to the power section 1 (phantom lines of FIG. 8) to loosen the stud bolts 62. Thus, the present invention provides a power hand tool which serves two functions of jack actuator and power wrench.

Figure 6:
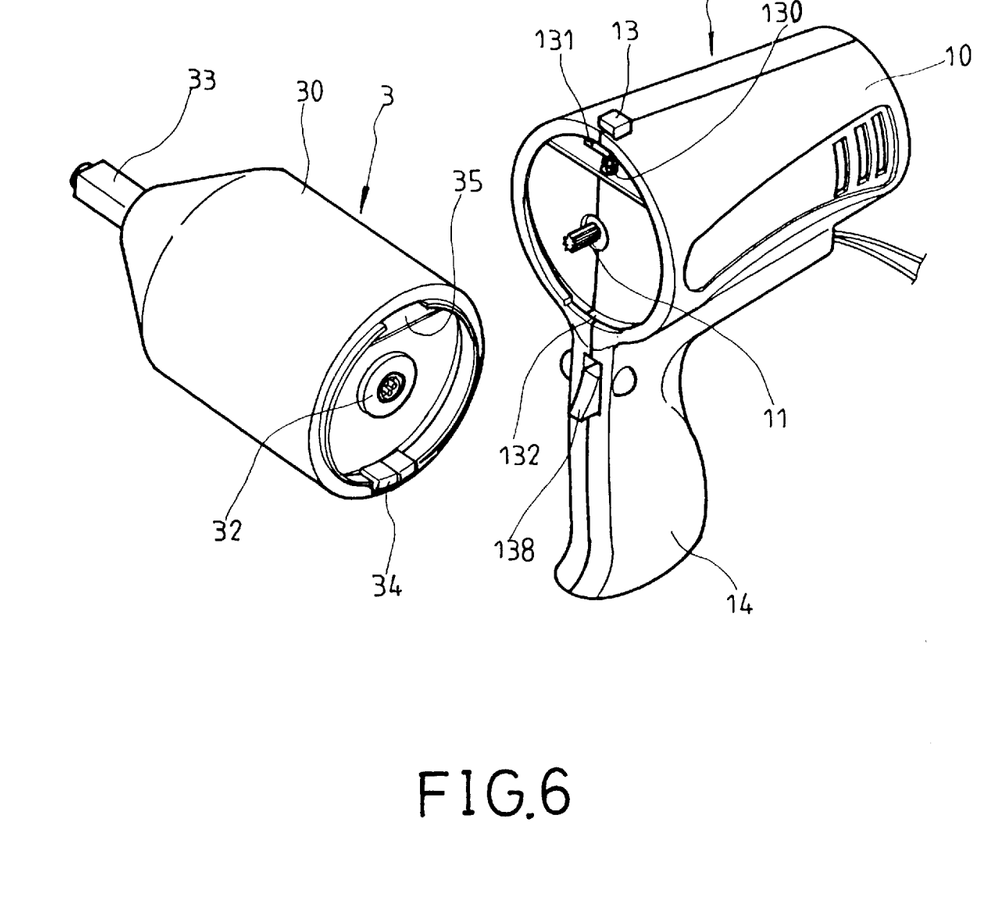
FIG. 6 is a perspective view showing a second embodiment of the exchangeable power hand tool in accordance with the present invention wherein the wrench section is shown separated from the power section, but the jack actuator section is not shown.
Figure 7:
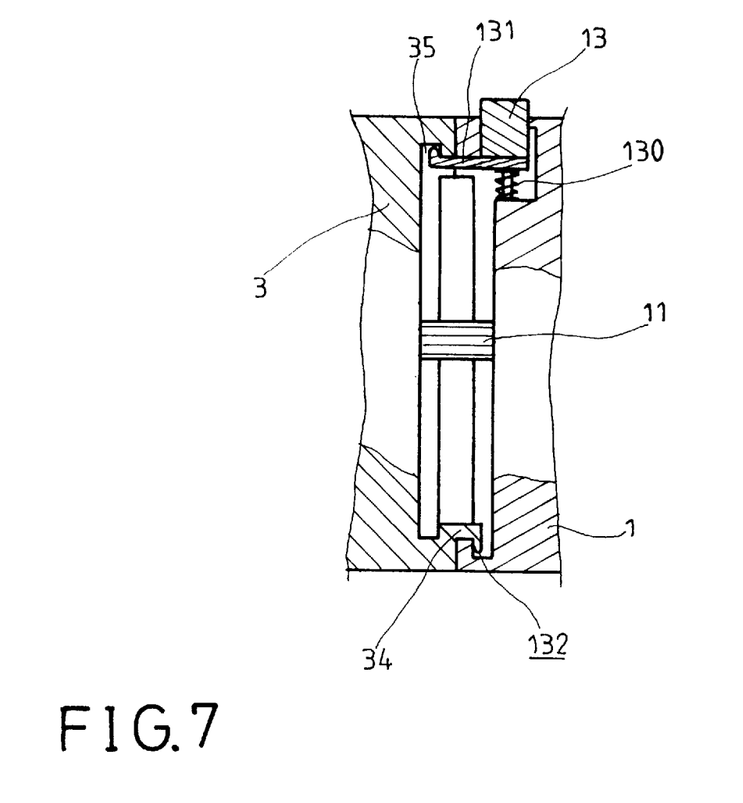
FIG. 7 is a cross-sectional view similar to FIG. 5, but showing the connection between the wrench section and the power section in accordance with the second embodiment of the present invention.

FIGS. 6 and 7 provide a second embodiment of the present invention in which the bayonet connector between the power section 1 and the tool section 2 or 3 is replaced by a spring-biased snap-on connector which comprises a paw 34 provided on the housing 30 of the wrench section 3 to engage a corresponding recess 132 provided on the housing 10 of the power section 1 and a manually controlled, spring-biased paw 131 provided on the housing 10 of the power section 1 and preferably located at a diametrically opposite position to the recess 132 to engage a corresponding recess 35 provided on the housing 30 of the wrench section 3. The paw 131 is provided with a pushbutton 13 accessible by a user and a spring 130 to bias the paw 131 to engage the recess 35. By pushing the pushbutton 13 against the spring 130, the paw 131 may be released from the recess 35 to disengage the wrench section 3 from the power section 1.

Although in FIGS. 6 and 7, it describes the connection of the wrench section 3 to the power section 1, it is to be understood that this is also applicable to the jack actuator section 2.

Those skilled in the art will readily recognize that various modifications of the present invention may be made without departing the scope of the present invention defined in the appended claim. Accordingly the preferred embodiment illustrated and discussed herein should be understood to be exemplary only in nature and the scope of the instant invention should be limited only by the following claims.

What is claimed is:

1. A power hand tool comprising a power section comprising a rotational output member to provide a rotational motion and a first and a second tool sections selectively and exchangeably connected to the power section to be driven thereby, each of the tool sections comprising releasable connecting means to connect to the power section, the first tool section further comprising first mechanical coupling means to couple to the rotational output member of the power section to receive the rotational motion therefrom and an end effector having an engaging member adapted to engage a jack to automatically actuate the jack, the second tool section further comprising second mechanical coupling means to couple to the rotational output member of the power section to receive the rotational motion therefrom and an output end adapted to engage a socket for loosening/tightening bolt/nut.

2. The power hand tool as claimed in claim 1, wherein the releasable connecting means for connecting the tool section to the power section comprises bayonet connectors.

3. The power hand tool as claimed in claim 1, wherein the releasable connecting means for connecting the tool section to the power section comprises snap-on type paw-recess pair, the paw being provided on one of the power section and the tool section and biased by a spring to engage the recess formed on the other one of the power section and tool section, a user accessible pushbutton being provided to allow a user to push the paw against the spring for releasing the engagement between the paw and the recess.

4. The power hand tool as claimed in claim 1, wherein the rotational output member of the power section comprises a pinion and wherein the first mechanical coupling comprises a gear train having input gears drivingly engageable with the pinion.

5. The power hand tool as claimed in claim 4, wherein the first tool section comprises a housing inside which a ring gear is fixed to receive therein a planetary gear system having a plurality of input planetary gears engaging the ring gear and defining therebetween an opening for receiving the pinion of the power section and drivingly engageable therewith with the pinion serving as a sun gear of the planetary gear system.

6. The power hand tool as claimed in claim 5, wherein the gear train comprises an output disk having a central, toothed hole engageably receiving therein a toothed end of the end effector to drive the end effector.

7. The power hand tool as claimed in claim 1, wherein the engaging member of the end effector is a U-shaped member.

8. The power hand tool as claimed in claim 7, wherein the end effector further comprises two opposite retaining plates which are located on opposite sides of the U-shaped member and adjustable in position to releasably sandwich the U-shaped member therebetween with the U-shaped member engaging the jack.

9. The power hand tool as claimed in claim 8, wherein each of the retaining plates comprises a rubber coated face.

10. The power hand tool as claimed in claim 1, wherein the rotational output member of the power section comprises a pinion and wherein the second mechanical coupling comprises an inner-toothed member engageably receiving and driving the pinion therein.

* * * * *